US012697781B1

(12) United States Patent
Roach et al.

(10) Patent No.: US 12,697,781 B1
(45) Date of Patent: Aug. 4, 2026

(54) MACHINE LEARNING FOR REAL-TIME MONITORING AND CONTROL OF ADDITIVE MANUFACTURING

(71) Applicant: National Technology & Engineering Solutions of Sandia, LLC, Albuquerque, NM (US)

(72) Inventors: Devin John Roach, Albuquerque, NM (US); Andrew Rohskopf, San Jose, CA (US); William Derek Reinholtz, Albuquerque, NM (US); Adam Wade Cook, Albuquerque, NM (US); Leah N. Appelhans, Tijeras, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 100 days.

(21) Appl. No.: 18/483,958

(22) Filed: Oct. 10, 2023

Related U.S. Application Data

(60) Provisional application No. 63/464,057, filed on May 4, 2023.

(51) Int. Cl.
*B29C 64/393* (2017.01)
*B29C 64/118* (2017.01)
*B33Y 50/02* (2015.01)

(52) U.S. Cl.
CPC .......... *B29C 64/393* (2017.08); *B29C 64/118* (2017.08); *B33Y 50/02* (2014.12)

(58) Field of Classification Search
CPC ..... B29C 64/10; B29C 64/112; B29C 64/118; B29C 64/165; B29C 64/386; B29C 64/393; B33Y 50/00; B33Y 50/02
See application file for complete search history.

(56) References Cited

U.S. PATENT DOCUMENTS

2020/0101670 A1* 4/2020 Howell ................ G06V 10/454

OTHER PUBLICATIONS

Zhang, Probabilistic invertible neural network for inverse design space exploration and reasoning[J]. Electronic Research Archive, 2023, 31(2): 860-881. doi: 10.3934/era.2023043, Published Dec. 2, 2022 (Year: 2022).*

(Continued)

*Primary Examiner* — Andrew L Swanson
(74) *Attorney, Agent, or Firm* — Kevin W. Bieg; Daniel J. Jenkins

(57) ABSTRACT

A machine learning (ML) approach enables real-time direct ink write (DIW) print-parameter optimization through in-situ monitoring of printed line geometry. The method can use an invertible neural network (INN) to solve both forward and inverse, or optimization, problems using a single network. By combining in-situ computer vision and INNs, DIW printing parameters can be autonomously optimized to print a target line width in a matter of seconds. Furthermore, defects that occur during printing can be rapidly identified and corrected autonomously. The method eliminates user-intensive, time-consuming, iterative parameter discovery approaches that currently limit accelerated implementation of DIW and other extrusion-based additive manufacturing processes.

4 Claims, 9 Drawing Sheets

(56) References Cited

OTHER PUBLICATIONS

Fung, V., Zhang, J., Hu, G. et al. Inverse design of two-dimensional materials with invertible neural networks. npj Comput Mater 7, 200 (2021). https://doi.org/10.1038/s41524-021-00670-x (Year: 2021).*
Pelzer L, Posada-Moreno AF, MÃ¼ller K, Greb C, Hopmann C. Process Parameter Prediction for Fused Deposition Modeling Using Invertible Neural Networks. Polymers. 2023; 15(8): 1884. https://doi.org/10.3390/polym15081884 (Year: 2023).*
Jin, Z. et al., "Autonomous in-situ correction of fused deposition modeling printers using computer vision and deep learning," Manufacturing Letters, 2019, vol. 22, pp. 11-15.
Jin, Z. et al., "Automated Real-Time Detection and Prediction of Interlayer Imperfections in Additive Manufacturing Processes Using Artificial Intelligence," Advanced Intelligent Systems, 2020, vol. 2, 1900130.
Johnson, M. V. et al., "A generalizable artificial intelligence tool for identification and correction of self-supporting structures in additive manufacturing processes," Additive Manufacturing, 2021, vol. 46, 102191.
Oleff, A. et al., "Process monitoring for material extrusion additive manufacturing: a state-of-the-art review," Progress in Additive Manufacturing, 2021, vol. 6, pp. 705-730.
Roach, D. J., et al., "Invertible neural networks for real-time control of extrusion additive manufacturing," Additive Manufacturing, 2023, vol. 74, 103742.
Wright, W. J. et al., "In-situ optimization of thermoset composite additive manufacturing via deep learning and computer vision," Additive Manufacturing, 2022, vol. 58, 102985.

* cited by examiner error number = 1
coordinates= 257,183
length= 500um
>>>

Solution: Log defect coordinates and location for re-print

Error #1: Line discontinuity 5 mm/s   10 mm/s   20 mm/s   40 mm/s   60 mm/s

Increase Printing Speed

Solution: Identify fluctuating line width & increase printing speed

Error #2: Coiling defect

Line Width:
798 μm

Print Parameters
D = 1.19
V = 30
A = 2.0
H = 1.0

Line Width:
300 μm

Print Parameters
D = 1.21
V = 60.13
A = 1.41
H = 0.44

MACHINE LEARNING FOR REAL-TIME MONITORING AND CONTROL OF ADDITIVE MANUFACTURING

CROSS-REFERENCE TO RELATED APPLICATION

This application claims the benefit of U.S. Provisional Application No. 63/464,057, filed May 4, 2023, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosure is submitted under 35 U.S.C. 102 (b) (1) (A): Devin J. Roach, Andrew Rohskopf, Samuel Leguizamon, Leah Appelhans, and Adam W. Cook, "Invertible neural networks for real-time control of extrusive additive manufacturing," *Additive Manufacturing* 74, 103742 (2023). The subject matter of this disclosure was conceived of or invented by the inventors named in this application.

BACKGROUND OF THE INVENTION

Direct ink write (DIW) 3D printing is an extrusion additive manufacturing (AM) process that is most well-known for enabling printability of a vast material library. Although the manufacturing process is the same, each material can exhibit unique properties tailored to specific end-use applications. Among the materials and applications that DIW enables are epoxies and other thermosets for high strength composites, smart materials for soft robotics, dielectric and conductive inks for electronics, bioprinting for organ replacement or drug delivery, and even chocolates for food printing. See J. W. Kopatz et al., *Addit. Manuf.* 46, 102159 (2021); K. Chen et al., *Soft Matter* 14 (10), 1879 (2018); C. D. Armstrong et al., *Adv. Intell. Syst.,* 2200226 (2022); S. C. Leguizamon et al., *Chem. Mater.* 33 (24), 9677 (2021); D. J. Roach et al., *Adv. Funct. Mater.* 32 (36), 2203236 (2022); Z. Wang et al., *Sci. Adv.* 6 (39), eabc0034 (2020); Y. Kim et al., *Nature* 558 (7709), 274 (2018); C. Chen et al., *Adv. Funct. Mater.* 30 (10), 1909469 (2020); J. A. Cardenas et al., *ACS Appl. Mater. Interfaces* 14 (40), 45342 (2022); J. Ahrens et al., *Adv. Mater.*, e2200217 (2022); M. A. Habib and B. Khoda, *J. Manuf. Process.* 76, 708 (2022); and R. Karyappa and M. Hashimoto, *Sci. Rep.* 9 (1), 14178 (2019). Nonetheless, each time a new material is developed, significant iterative experimentation is required to determine the optimal printing parameters to achieve a desired 2D or 3D geometry.

For a single material, printed line geometry can be varied substantially by simply manipulating the printing parameters. For example, Yuk et al. demonstrated that by adjusting the height from the printing substrate the viscoelastic effects of shear-thinning inks produces widely varying printed lines. See H. Yuk and X. Zhao, *Adv. Mater.* 30 (6), 1704028 (2018). Similarly, by varying the DIW printing speed or nozzle diameter, functional materials' properties such as conductivity or actuation strain can vary dramatically. See A. Haake et al., *Adv. Mater.*, e2200182 (2022); A. Sydney Gladman et al., *Nat. Mater.* 15 (4), 413 (2016); and D. J. Roach et al., *ACS Appl. Mater. Interfaces* 11 (21), 19514 (2019). These works demonstrate the highly complex relationship between the DIW printing parameters and the resulting material properties. Furthermore, for each new material developed it is challenging to determine to optimize DIW printing parameters to produce printed objects that match a targeted geometry. To solve this issue, a model must be constructed that accurately represents the relationship between the input printing parameters and a specific DIW output, namely the printed line geometry.

Current methods for establishing relationships between printing parameters and fidelity of printed line segments requires both extensive operator experience or substantial trial-and-error time. In many instances an empirical model is developed for each new material to eliminate common defects that occur during DIW printing. Shahzad et al. outlined the most common defects which include discontinuities in printed line segments, part-to-part variability, and dissimilarities between parts produced by multiple operators of DIW equipment. See A. Shahzad and I. Lazoglu, *Compos. Part B: Eng.* 225, 109249 (2021). To achieve this, one approach is to build a broad process-structure-property relationship. See R. Tandel and B. A. Gozen, *J. Mater. Process. Technol.* 302, 117470 (2022). Nonetheless, these methods require substantial front-end investigation for each new material and significant time to experimentally derive the required parameters. As increasingly complex material systems emerge, it is critical to develop a method for autonomous DIW parameter optimization that minimizes subjective user experience.

In recent years, researchers have turned to a broad range of machine learning (ML) methods to realize autonomous process optimization for additive manufacturing. See Z. Jin et al., *Matter* 3 (5), 1541 (2020); and P. Oehlmann et al., *Prod. Eng.* 15 (3), 467 (2021). For example, artificial neural networks (ANNs) have been used to model how the evolution of residual stresses can cause dimensional inaccuracies during fused filament fabrication (FFF) extrusion AM. See S. Chowdhury and S. Anand, "Artificial Neural Network Based Geometric Compensation for Thermal Deformation in Additive Manufacturing Processes," in *ASME* 2016 11*th International Manufacturing Science and Engineering Conference* (2016). Operators have used such models to adjust printing parameters or modify part design to compensate for residual stresses that appear in an object during or after FFF 3D printing. While residual stresses are not a common source of error during DIW printing, ANNs have also been used to model the relationship between DIW printing parameters and a printed object's subsequent mechanical properties. See D. J. Roach et al., *Addit. Manuf.* 41, 101950 (2021). These ML approaches eliminate the need for extensive design and simulation when targeting specific geometries or mechanical responses. Nonetheless, these approaches are only able to create one-way or forward relationships and require subsequent human intervention to determine optimal printing parameters. To mitigate this, alternative parameter optimization approaches which solve the optimization, or inverse problem, are still required.

Recently, a multitude of optimization algorithms have been used for autonomous process parameter discovery. For example, Bayesian optimization (BO) is a promising approach for material property optimization or autonomous structural design as it provides a global optimization approach for complex design spaces. See M. Yamawaki et al., *Sci. Adv.* 4 (6), eaar4192 (2018); F. Häse et al., *ACS Cent.*

*Sci.* 4 (9), 1134 (2018); H. C. Herbol et al., *Npj Comput. Mater.* 4 (1), 1 (2018); P. Nikolaev et al., *Npj Comput. Mater.* 2 (1), 1 (2016); A. E. Gongora et al., *Sci. Adv.* 6 (15), eaaz1708 (2020); and J. Matthews et al., *J. Mech. Des.* 138 (4), 041404 (2016). Nonetheless, BO requires many iterations on a representative model within the design space to determine optimal parameters. This makes BO impractical for many AM processes where obtaining training data is expensive, or feedstock material is limited. Alternatively, optimization algorithms can be combined with real-time process information to enable rapid, supervised learning. Many AM process monitoring approaches were first developed for FFF 3D printing and have recently been adopted for other AM processes. See A. Oleff et al., *Prog. Addit. Manuf.* 6 (4), 705 (2021). The most promising approach is to use cameras to record in-situ visual information. For example, Johnson et al. used machine vision to compare DIW printed line geometry with designed line geometry. See M. V. Johnson et al., *Addit. Manuf.* 46, 102191 (2021). Then, to discover optimal printing parameters, a halving algorithm was iterated until an appropriate agreement between the printed and designed line geometry was discovered. Similarly, Deneault et al. used machine vision to compare the lead-in segment geometry of a printed line with a target. See J. R. Deneault et al., *MRS Bull.* 46 (7), 566 (2021). BO was then used to scan the design space, including printing speed and prime delay, to decide the next iteration of printing parameters until a satisfactory lead-in geometry was achieved. While these methods highlight the efficacy of using visual information for process optimization schemes, they rely on post-print imaging and subsequent experimental iteration to converge on an ideal solution. Furthermore, these methods are slow, requiring re-optimization each time a new target geometry is needed and require separate algorithms to model both the forward and inverse problems.

A recently developed ML method called an invertible or inverse neural network (INN) has been gaining traction for its ability to accurately model both forward and inverse problems in a complex design space using a single network. See J.-H. Jacobsen et al., *i-revnet: Deep invertible networks*, arXiv preprint arXiv: 1802.07088 (2018); and L. Ardizzone et al., *Analyzing inverse problems with invertible neural networks*, arXiv preprint arXiv: 1808.04730 (2018). A defining characteristic of INNs is the use of inverse matrix operations which can only be achieved using square networks; meaning the INN must have an equal number of inputs, outputs, and nodes in the hidden layers. Consequently, INNs retain the same accuracy solving both forward and inverse problems. As a result of their ability to accurately model inverse problems, INNs are particularly well-suited to rapidly solve global optimization problems where real-time information about the inputs and outputs is available.

In contrast to the previously described machine vision methods where images were obtained after printing, acquiring in-situ images enables real-time printing parameter optimization. Computer vision is a common method for obtaining real-time visual information for use in closed-loop process optimization. See A. Kazemian et al., *Autom. Constr.* 101, 92 (2019); and A. J. Spence et al., *J. Neurosci. Methods* 215 (2), 164 (2013). The fundamental difference between computer vision and machine vision is that while both techniques obtain visual information as images, computer vision interprets and performs actions based on those images in real-time. The most prominent method for analyzing in-situ computer vision data is with convolutional neural networks (CNNs). CNNs are designed for image analysis and pattern recognition and have been used extensively to identify if proper printing parameters such as extrusion rate, layer height, or printing speed are being used to generate printed features and parts to design specifications. See Z. Jin et al., *Adv. Intell. Syst.* 2 (1), 1900130 (2020); and Z. Jin et al., *Manuf. Lett.* 22, 11 (2019). After sufficient training of a CNN, imaging of multiple trial prints can be used for printing parameter optimization of geometries outside of the initial training data set. See W. J. Wright et al., *Addit. Manuf.* 58, 102985 (2022). While qualitative print assessments offered by CNNs and iterative process optimization schemes are useful for process control; real-time optimization and modulation of quantitative, measurable DIW outputs remains a significant challenge.

SUMMARY OF THE INVENTION

The present invention is directed to methods for the real-time process monitoring and in-situ optimization of direct ink write (DIW) 3D printing using computer vision and machine learning algorithms. A method for in-situ process optimization of DIW printing comprises providing a DIW printer configured to print an ink subject to one or more printing parameters, measuring an output of the printed ink in real-time using computer vision, comparing the measured output to a target output, optimizing the one or more printing parameters of the DIW printer using a pre-trained invertible neural network model to produce the target output, and printing the ink on a substrate subject to the optimized one or more printing parameters. A method for real-time monitoring of defects during DIW printing comprises providing a DIW printer configured to print an ink on a substrate, detecting one or more defects in the printed ink using real-time computer vision, and correcting the one or more defects.

As an example of the invention, real-time measurements of the printed line width were taken at speeds of up to 200 Hz with resolution of 2.5 μm per pixel. Common printing defects were identified, and simple adjustment strategies were implemented to correct these defects. An invertible neural network was then used to provide a model for the relationship between the printed line width and the DIW printing parameters including print speed, extrusion rate, nozzle diameter, and height from the print bed. Using the deep INN, both the forward and inverse problem can be solved, eliminating reliance on arduous trial-and-error print parameter discovery. A combination of the computer vision and the deep INN can be used to find process parameters that yield a desired line width. Specifically, the optimization relies on the deep INN as a surrogate model to determine new printing parameters that are closest to the current parameters, generating rapid in-situ DIW print optimization. Overall, the invention can eliminate the need for time-consuming, iterative process discovery approaches currently limiting the reliability and broad implementation of extrusion AM processes. Knowledge of the effect of material viscosity on the deep INN training and performance can further enable in-situ optimization of inks that have thixotropic or shear-thickening properties, including energetic materials for energy storage or bio-inks for organ replacement.

BRIEF DESCRIPTION OF THE DRAWINGS

The detailed description will refer to the following drawings, wherein like elements are referred to by like numbers.

FIG. 3A shows a typical line discontinuity defect occurring during DIW printing. The computer vision algorithm can identify the defect and provide its length and location for reprinting. FIG. 3B shows a common coiling defect occurring during DIW printing. The computer vision algorithm can identify the coiling defect and autonomously print a series of new lines with increasing printing speed until the coiling defect is eliminated.

DETAILED DESCRIPTION OF THE INVENTION

The present invention provides a framework upon which real-time monitoring and rapid optimization of DIW printing parameters can be achieved. By combining in-situ process monitoring enabled by computer vision and single-step INN-driven process optimization, iterative approaches of printing parameter optimization can be eliminated. Defects such as coiling, die-swell, line thinning, or segment discontinuities are common in DIW and represent classes of features that can be rapidly identified and corrected in-situ. To achieve INN-driven optimization, an in-situ computer vision technique can be deployed for INN training and real-time process monitoring of intentionally formed defects. As an example of the invention, the INN was used to solve the inverse optimization problem to print a geometrically complex vase with a specified, target line width in a single step. Further, in-situ computer vision and INN can be combined to provide real-time, on-the-fly process optimization.

Figure 1A:
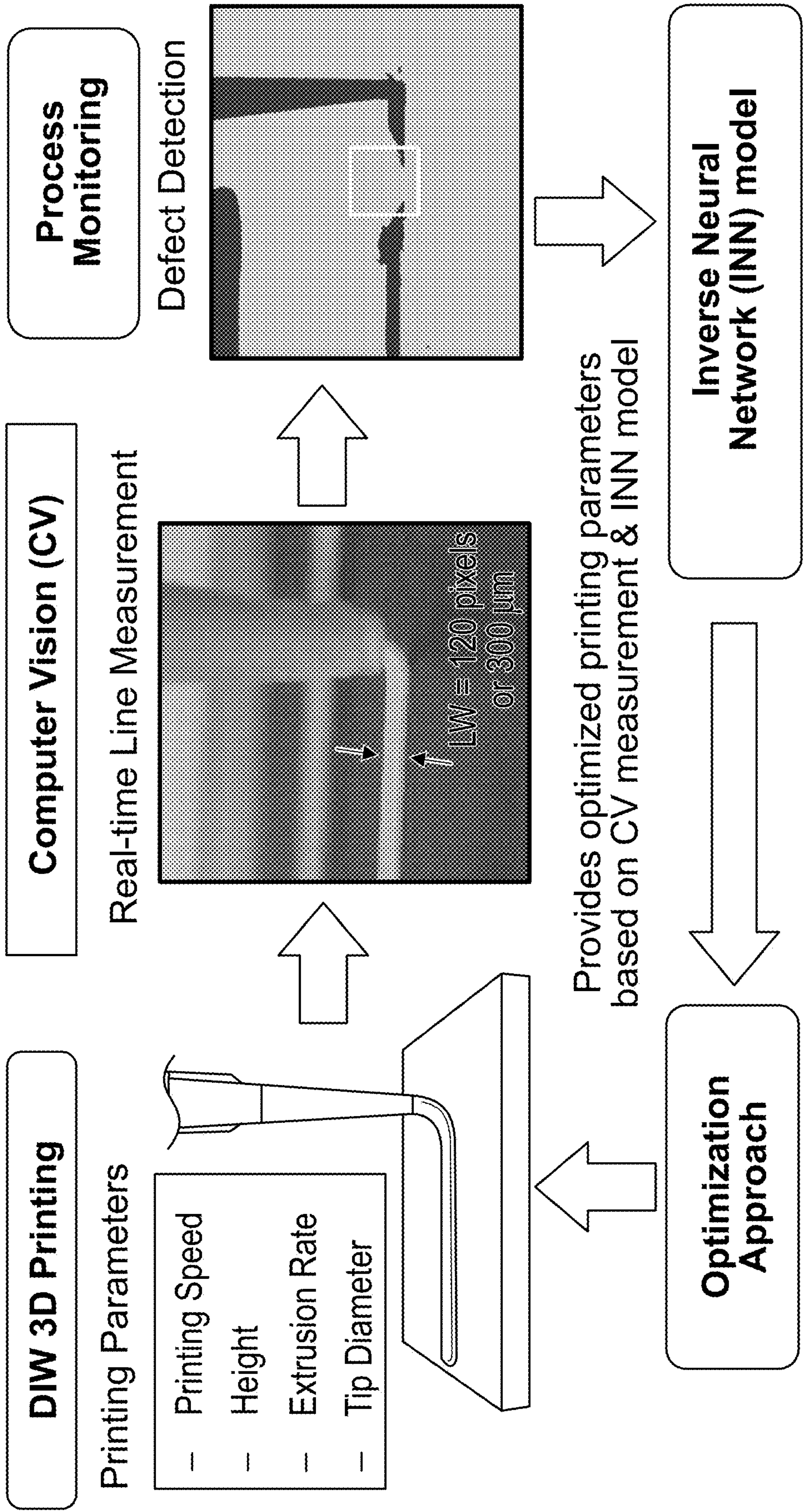
FIG. 1A is a schematic illustration of the real-time DIW process monitoring and optimization approach of the present invention.

An overview schematic illustrating the ML approach for real-time DIW process monitoring and print parameter optimization is shown in FIG. 1A. The primary components of the ML approach are a computer vision (CV) algorithm which provides real-time process monitoring and printed line width measurements and the deep inverse neural network (INN) model which is used to adjust DIW printing parameters to achieve a target line geometry. The following sections describe how each of the components of the ML approach was developed and implemented.

Parameter Space Characterization

The printer used to demonstrate the invention was a custom engineered DIW system having computer-controlled motion stages to translate a build plate in the X-Y plane. A constant displacement syringe pump affixed to the translating motion stage of the Z-axis provided a method of depositing the printing inks. The ink used for most prints comprised a two-part silicone elastomer, DOWSIL SE 1700, produced by DOW Chemical. The silicone ink was prepared for printing by homogenizing at a ratio of 10:1 part A:B in a vacuum planetary mixer for 60 s at 2000 rpm and 7 kpa. The silicone elastomer was printed at room temperature onto PTFE-coated aluminum plates.

Figure 1B:
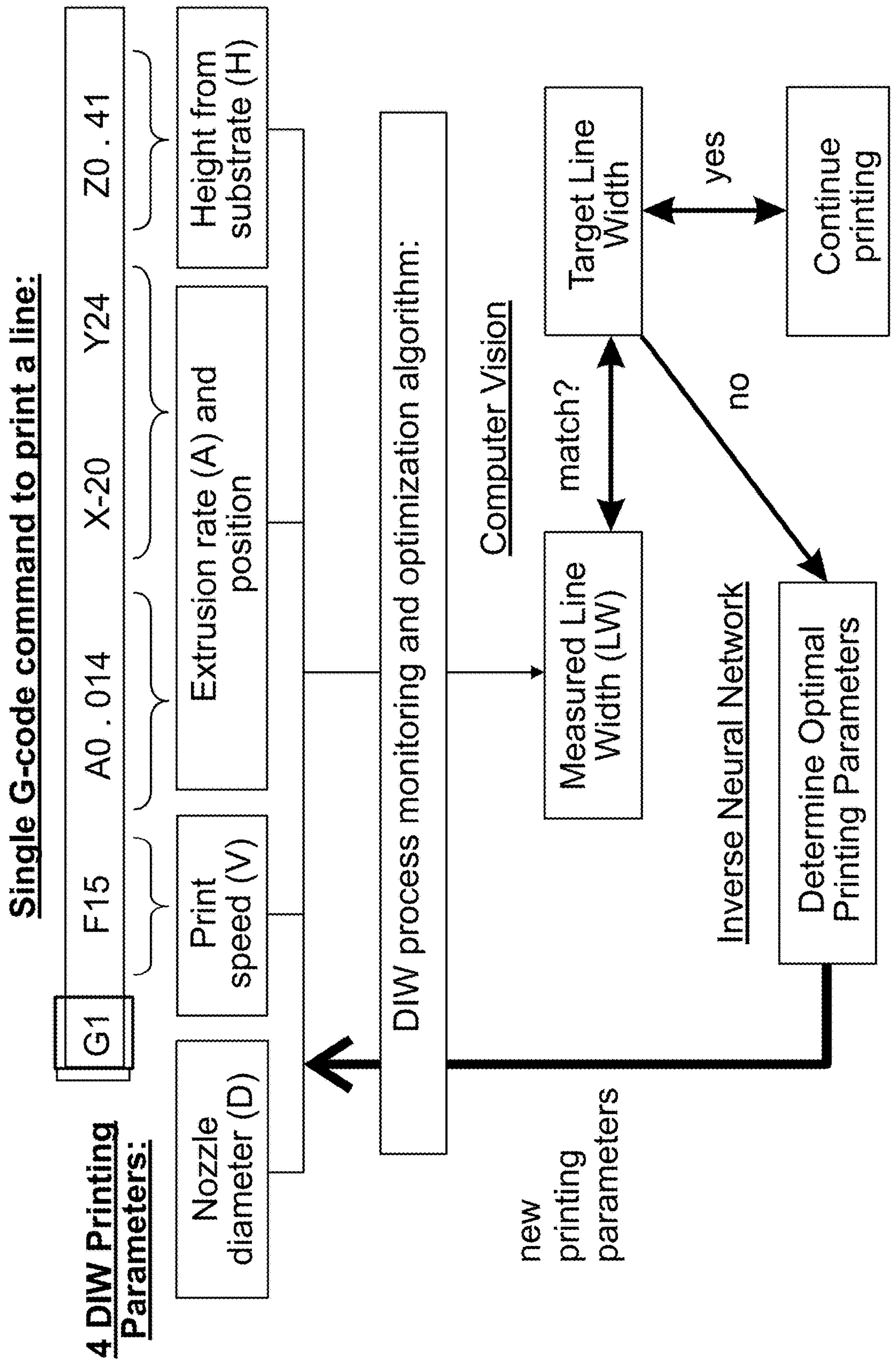
FIG. 1B illustrates an exemplary implementation of the invention. The four input DIW printing parameters can be represented using a single line of G-code, the software command used to operate a DIW printer. The flowchart shows how computer vision process monitoring of the output line width can be combined with an INN model to perform real-time DIW process optimization.

The DIW printing parameter space can be significantly large and, as a result, select assumptions were required. First, pneumatically assisted DIW extrusion can lead to highly nonlinear fluid flow making rapid, in-situ optimization very difficult. For this reason, constant displacement linear extrusion was used for DIW printing. Next, to eliminate nonlinear extrusion, it was assumed that the ink being printed is rheologically stable at high shearing rates (above 1/s). See M. M. Durban et al., *Macromol. Rapid Commun.* 39 (4), 1700563 (2018). After making these assumptions and selecting a printing nozzle size (i.e., tip diameter), the DIW printing parameter space can be captured using a single line of G-code, the primary programming language used for extrusion AM. FIG. 1B illustrates an exemplary implementation of the invention. The figure shows sample DIW printing parameters and how they are related to a line of G-code. The four input printing parameters used were nozzle diameter (D), print speed (V), linear extrusion rate (A), and the height from the substrate (H). The measurable output of the DIW printing process is the printed line width (LW). The output LW was measured using a computer vision set-up and custom computer vision algorithm. Next, the measured LW was compared to the designed, or target LW. If these do not match, the pre-trained deep INN is used to determine the printing parameters that are needed to produce the target LW. A new line of G-code was then developed and executed on the DIW printing platform until the measured LW and target LW match.

Computer Vision Monitoring of Output Line Width

Figure 2A:
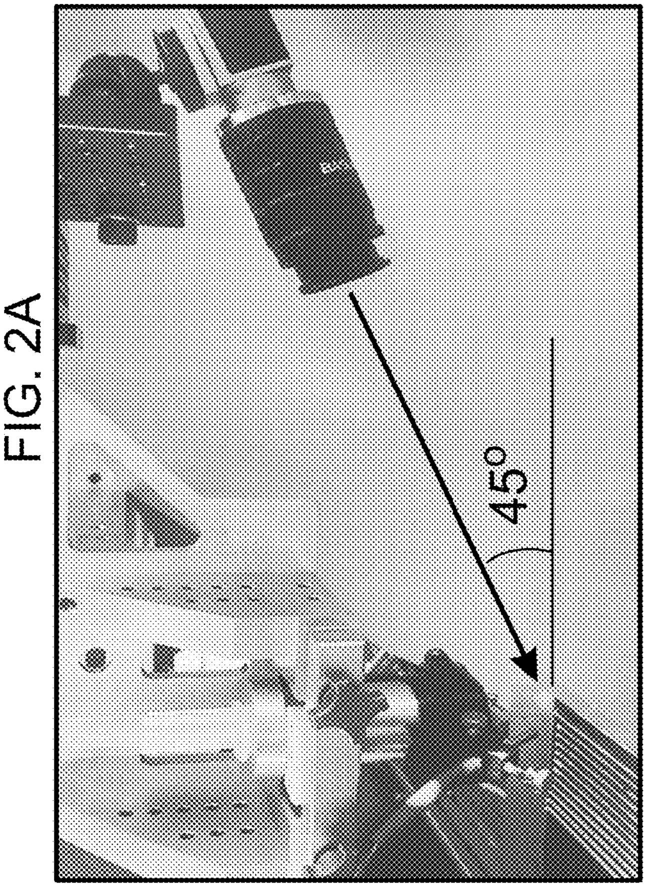
FIG. 2A is a photograph of a computer vision set-up used for process monitoring and real-time optimization.

Computer vision tools have seen large advancements in recent years, enabling rapid identification of critical features from images. Some examples include facial recognition on smart phones or road condition detection on new vehicles. See S. Singh and S. V. A. V. Prasad, *Procedia Comput. Sci.* 143, 536 (2018); and H. Fujiyoshi et al., *IATSS Res.* 43 (4), 244 (2019). In an exemplary implementation of the invention, images were obtained using a camera aimed at a 45-degree viewing angle to the output of DIW printing nozzle as shown in FIG. 2A. The computer vision system comprised a single Basler ace 2 pro camera with a 45 mm fixed focal length lens pointed at a 45-degree viewing angle to the deposition nozzle. Images were acquired using a CameraLink cable connection to an NI PXIe 1088 chassis using a PXIe-1435 Frame Grabber Module (National Instruments, Austin, TX, USA). After imaging, computer vision algorithms in the NI Vision Assistant software were used for the measurement of the printed line width. This allowed for optimal image processing and measurement of the printed line width. See R. Figueiredo et al., *Rob. Auton. Syst.* 117, 17 (2019). In addition to the viewing angle, proper lighting conditions are critical for ensuring accuracy of the computer vision algorithm. Here, a red ring light was used to provide illumination suitable for imaging the features of interest.

Figure 2B:
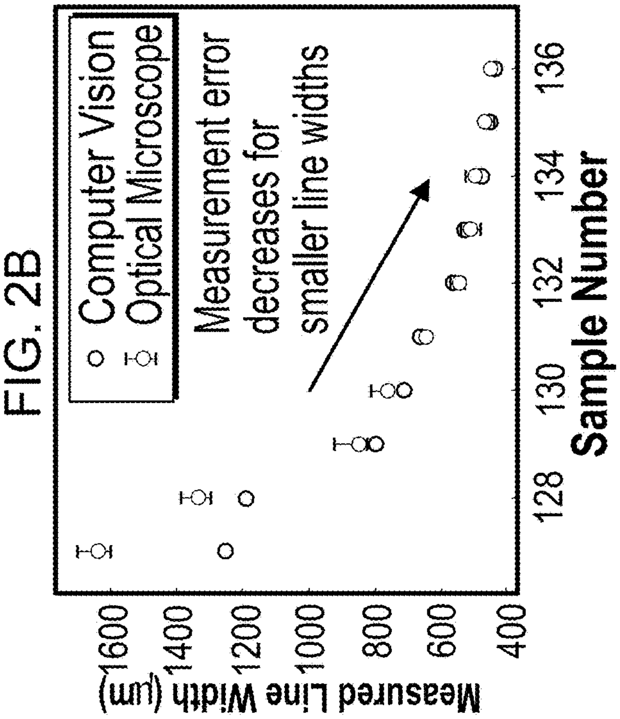
FIG. 2B is a graph of line width measurements using computer vision compared to a calibrated optical microscope.

Validation of the accuracy of the computer vision-based line width measurements was performed by measuring a subset of printed lines from the training dataset using a high-resolution Keyence VHX7000 microscope. Tabulated printing parameter values for sample numbers 127-136 used for the validation are shown in Table 1. As seen in FIG. 2B, the computer vision and optical microscope line width measurements exhibited good agreement for line widths below 1000 μm. Above 1000 μm, however, higher error was observed, up to 26%. For this reason, only lines below 1000 μm were used throughout the study. Further geometric adjustment strategies can be used to measure lines more accurately above 300 μm.

TABLE 1

Sample DIW printing parameters and corresponding output line width.

| Print parameter sample number | | 127 | 128 | 129 | 130 | 131 | 132 | 133 | 134 | 135 | 136 |
|---|---|---|---|---|---|---|---|---|---|---|---|
| Inputs | D (mm) | 0.84 | 0.84 | 0.84 | 0.84 | 0.84 | 0.84 | 0.84 | 1.19 | 1.19 | 1.19 |
| | H (mm) | 2 | 2 | 2 | 2 | 2 | 2 | 2 | 1 | 1 | 1 |
| | V (mm/s) | 5 | 10 | 25 | 40 | 60 | 100 | 200 | 5 | 10 | 25 |
| | A (mm/s) | 0.6 | 0.6 | 0.6 | 0.6 | 0.6 | 0.6 | 0.6 | 0.3 | 0.3 | 0.3 |
| Output | LW (μm) | 1250 | 1190 | 797.5 | 712.5 | 662.5 | 562.5 | 525 | 477.5 | 450 | 437.5 |

Figure 2C:
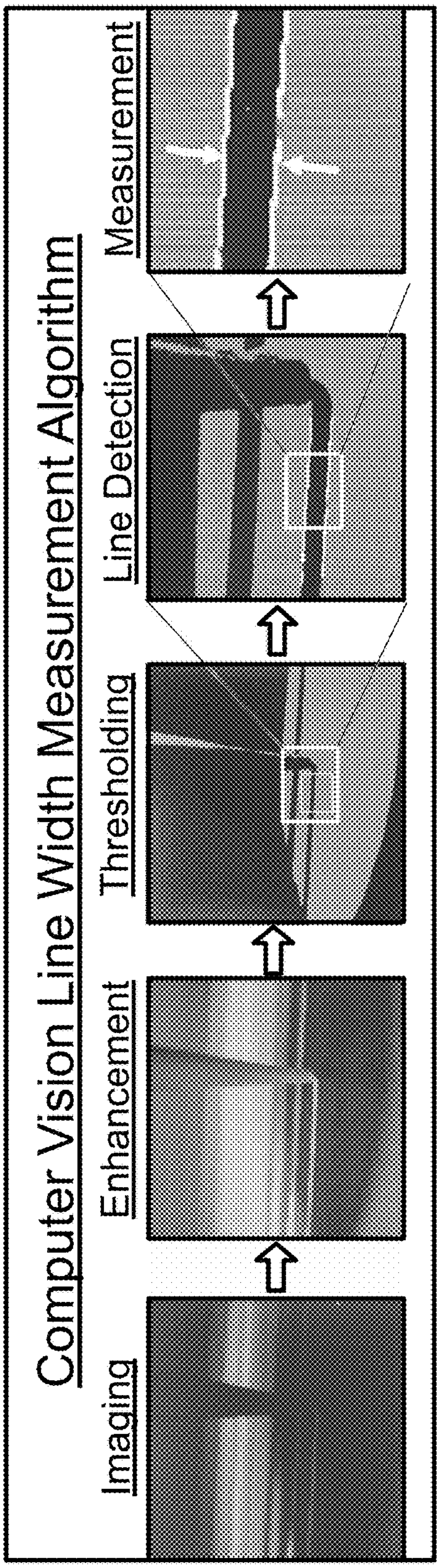
FIG. 2C is a flowchart depicting how the computer vision algorithm can be used for line measurement.

Each of the steps comprising the computer vision line width measurement algorithm are shown in FIG. 2C. First, the image brightness and contrast were enhanced by 50%. Next, a color plane extraction algorithm was used to compress the image to 2D. A thresholding algorithm was then applied to separate pixels according to their brightness value. The threshold was set to a pixel intensity of 166 out of 225. The edges of the printed line were found using Canny edge detection followed by the Hough line finding algorithm. See N. Kiryati et al., *Pattern Recognit.* 24 (4), 303 (1991). FIG. 2C shows the lines detected using this method. Finally, a max clamp measurement, which simply subtracts the distance between two lines, was used to measure the distance, in pixels, between the two lines. To convert the measured line width from pixels to millimeters, the computer vision system required calibration. Calibration was performed by placing a scale in the field-of-view, taking an image, and measuring the number of pixels per millimeter. The experimental set up was capable of resolving 250 pixels per millimeter, providing a resolution of 2.5 μm per pixel. To achieve real-time process monitoring, the computer vision system was not only designed to perform high-resolution measurements, but also to obtain rapid measurements of the printed line width. The system could acquire images and process them, e.g. measure the printed line width, at a rate of up to 200 measurements per second, or 200 Hz.

Real-Time Process Monitoring of Defects

Figure 3A:
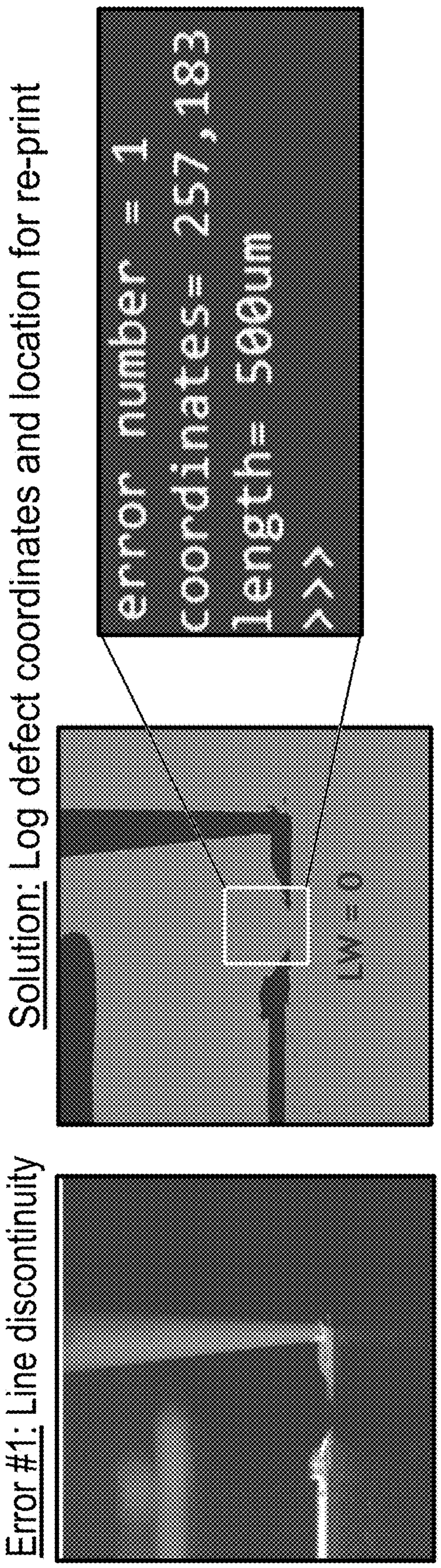
FIGS. 3A and 3B illustrate common print defect detection and correction using the computer vision algorithm.
Figure 3B:
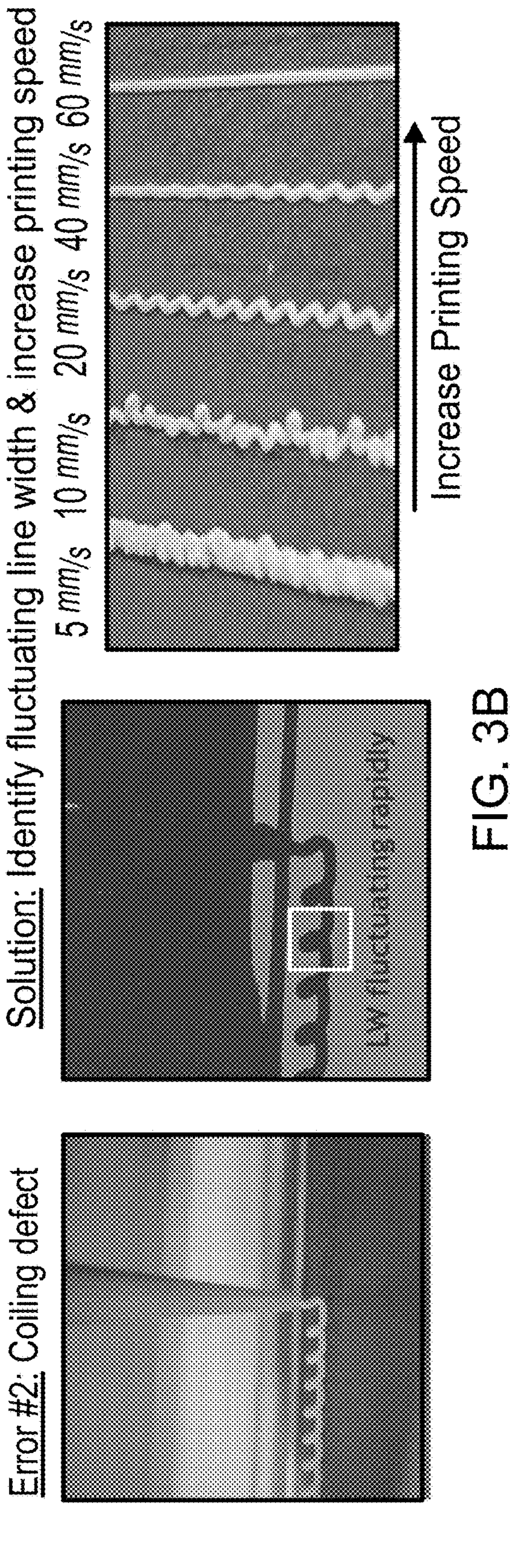

In addition to measuring DIW output line widths in real-time, the computer vision algorithm can also be used for in-situ process monitoring of defects. As an example, computer vision was used for the detection of two of the most common defects that occur during DIW printing. FIG. 3A shows a line discontinuity defect which commonly occurs due to particulates in the ink, which cause blockages in the flow, or sudden changes in ink viscosity. Air pockets within a printing fluid can also produce this type of defect. To detect the defect, the computer vision algorithm contains an IF statement which seeks line widths that are equal to zero. The length of the defect as well as the X and Y coordinates of where the defect begins are autonomously logged so that a simple repair of the defect can be performed before moving to subsequent layers. Another common defect is line coiling as shown in FIG. 3B. These defects occur when the printing parameters are not properly tuned, such as when the rate of material extrusion is too high relative to the rate of translation of the build plate. To detect coiling defects, the computer vision algorithm contains another IF statement which seeks to identify large, irregular changes in line width. After detection, the algorithm can iteratively correct printed lines by increasing the printing speed until the coiling defect is eliminated. The optimized parameters are then stored and used for future prints. More complex, CNN-based defect detection methods can be implemented for defect detection and correction, such as those proposed by Wright et al. See W. J. Wright et al., *Addit. Manuf.* 58, 102985 (2022).

DIW Process Modeling Using ML Methods

In the previous examples, the computer vision algorithm was used to monitor the printed line quality as well as detect and correct for typical defects that occur during the printing process. Nonetheless, achieving a specific, targeted line width requires a more complex feedback control procedure where a sophisticated model of the relationship between the DIW printing parameters and the output line width is needed. Therefore, to capture this relationship, an invertible neural network (INN) was used. Distinguishing features of an INN is that each layer of the network contains the same number of nodes and that invertible activation functions are used. These characteristics enable inverse matrix operations to be performed so that the model can be evaluated both forward and inversely. This contrasts with traditional artificial neural network architectures which can only provide unidirectional relationships between the inputs and outputs. Furthermore, INNs retain the same accuracy when solving both the forward and inverse problem.

Training and Design of the INN

Figure 4A:
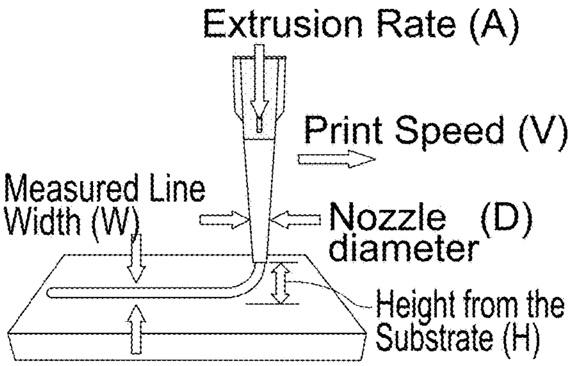
FIG. 4A is a schematic illustration showing the four primary input printing parameters, namely the nozzle diameter (D), print speed (V), extrusion rate (A), and height (H) and the output line width (LW).
Figure 4B:
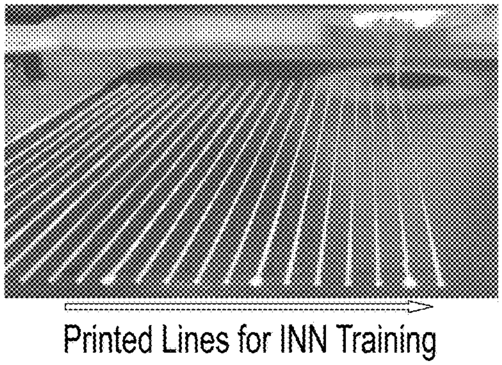
FIG. 4B is an example image of a training approach where 196 lines were printed using varying printing parameters and the output line width was measured.

As an example, four input DIW printing parameters and a single output line width parameter were used to capture the DIW printing design space. Each of the parameters and their associated variable are shown schematically in FIG. 4A. To train the INN, 196 distinct lines were printed using varying printing parameters with line width measurements made in real-time. This method provides a simple, time-efficient approach for INN training. An image showing an example of the training runs is shown in FIG. 4B.

The INN used in this study was a neural network that can contain anywhere from 1 to 9 hidden layers; this number was chosen to keep the number of optimizable parameters less than the number of training data points. The input, output, and hidden layers all contain 4 nodes as shown schematically in FIG. 4C. The inputs to the INN are the four primary parameters used for DIW printing: nozzle size (D), print speed (V), extrusion rate (A), and height from the print bed (H). The outputs are the line width (LW), and 3 unused nodes, $\chi_1$, $\chi_2$, and $\chi_3$, which are needed to reconstruct the inputs when evaluating the inverted network. After training the model, simple inference on the training and validation sets tells the range of $\chi$ values that should be sampled when reconstructing the inputs. Other more fundamental studies on INNs mention techniques such as enforcing the $\chi$ values to match a certain distribution, as a normal distribution, which may be more convenient with using different sampling methods to reconstruct desirable inputs. See L. Ardizzone et al., "Analyzing inverse problems with invertible neural networks," arXiv preprint arXiv: 1802.04730 (2018); and M. Finzi et al., "Invertible convolution networks," in *Workshop on Invertible Neural Nets and Normalizing Flows*, Int. Conf. Mach. Learn (2019). Although only one output (line width) was considered in this design, one could incorporate other meaningful outputs such as quantifying a line type or line shape, which could reduce the number of $\chi$ values needed to reconstruct desirable inputs.

Figure 4C:
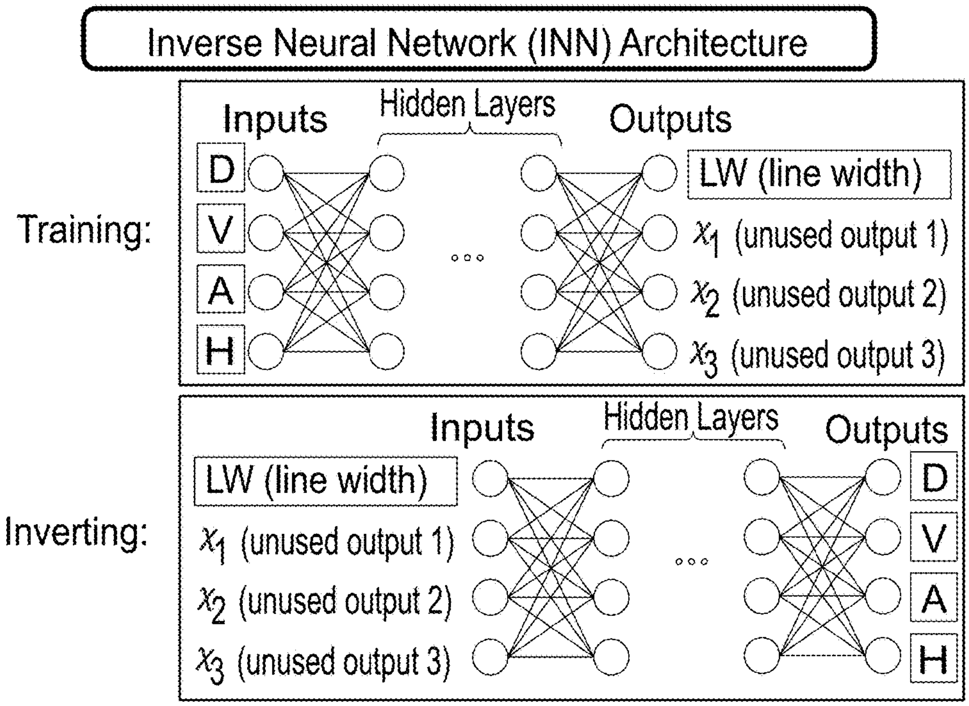
FIG. 4C shows the network architecture with 4 nodes for all layers, which allows for an invertible architecture. The LW is the only output used in the loss function. Three extra "unused outputs" are not used in training, but are necessary for reconstructing the inputs, as shown in the illustration of the inverted model.

An illustration of the network architecture used for training and inverting is shown in FIG. 4C. The network observed four input parameters: nozzle size (D), print speed (V), extrusion rate (A), and height (H) from the substrate. While the network can possess any number of hidden layers, it is good practice to keep the number of optimizable parameters near the number of training data points to prevent overfitting. Using a 4×4 square network architecture with biases, each hidden layer introduces 4(4+1)=20 optimizable parameters. Therefore, to keep the number of optimizable parameters near the number of training data points, the number of hidden layers was kept at less than 9.

Figure 5A:
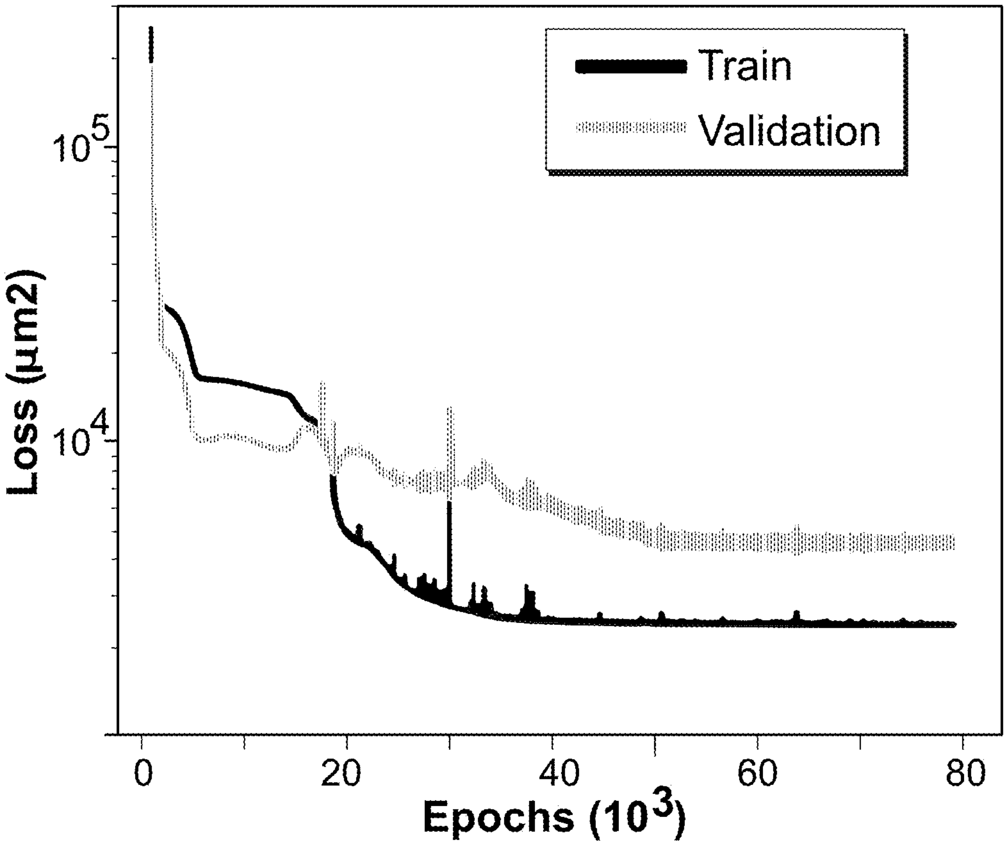
FIG. 5A is a graph of INN loss function, defined as linewidth mean squared error for 90% training and 10% validation sets.
Figure 5B:
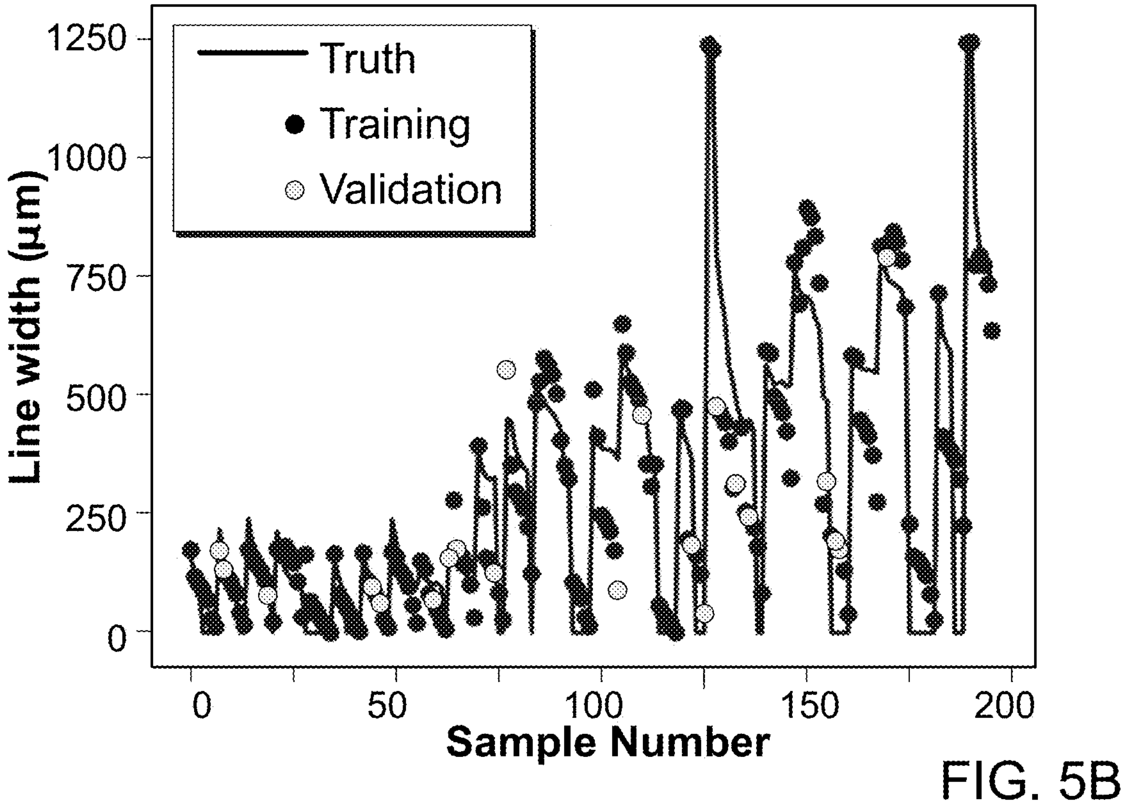
FIG. 5B is a graph of visual depiction of line width agreement for all 196 samples, with training data points and validation evaluations, showing that the INN can accurately model the design space.

During INN training, a loss function is defined such that only the first output node, line width, is used to match the training data. As a result, the remaining three output nodes are free to take any value, without factoring into the loss function. The INN was trained using PyTorch with the Adam gradient descent optimizer. Using a learning rate of $5\times10^{-4}$, these networks converge to minimum values on average in approximately 10,000 to 100,000 epochs, as seen in FIG. 5A. The data was split into 90% training and 10% validation data to properly interrogate the accuracy of the INN when performing cross validation studies. The trained INNs achieve a root mean square error (RMSE) between training and target linewidths of 30-50 μm. A graph portraying the INNs accuracy in modelling the relationship between DIW printing parameters and the output line width can be seen in FIG. 5B. The sample number shown in the x-axis refers to the 196 unique combinations of printing parameters that were used for training the neural network. The results demonstrated good agreement with the trends shown in previous studies, such as those observed in Yuk et al., where empirical and analytical relationships were derived for each of the DIW printing parameters. See H. Yuk et al., *Adv. Mater.* 30 (6), 1704028 (2018).

Inverse Problem Using Deep INN

Figure 5C:
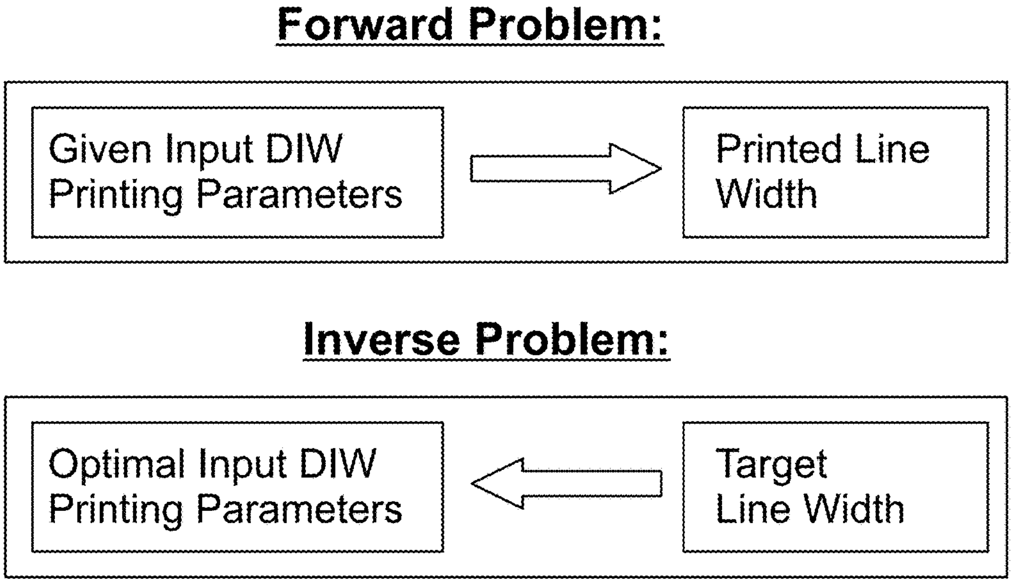
FIG. 5C illustrates the forward and inverse problem.

After training, the deep INN described above can accurately predict the width of DIW printed lines given the input printing parameters. This is called the forward problem because the deep INN was trained by iteratively varying the DIW printing parameters and measuring the output line width associated with each parameter space. However, because it is invertible, the deep INN can also solve the inverse problem, i.e., which DIW printing parameters will produce a given printed line width. This distinction is shown conceptually in FIG. 5C.

Figure 5D:
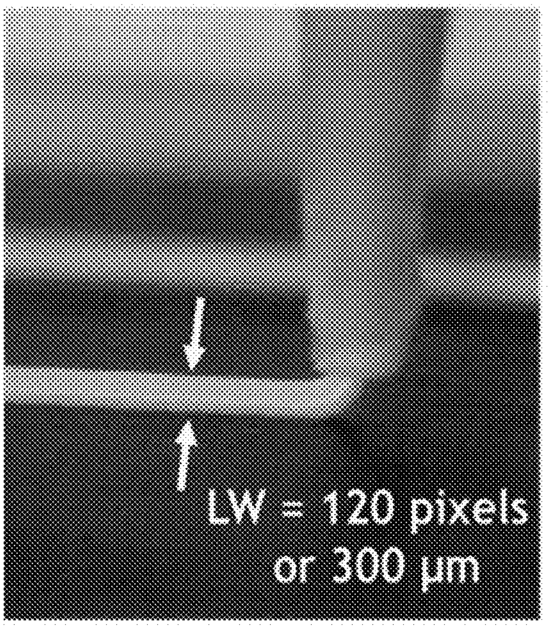
FIG. 5D is an image of the target line width being printed using the printing parameters determined by the INN.
Figure 5E:
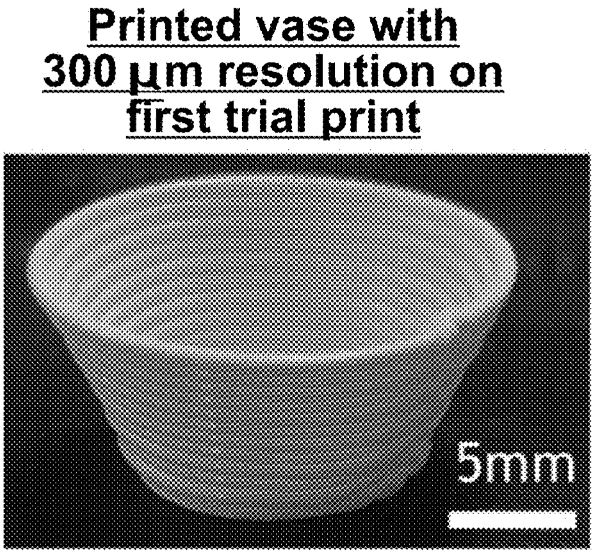
FIG. 5E is a photograph of a vase printed with high-fidelity and accurate geometry on the first print by using the optimized printing parameters determined by the INN.

To demonstrate the INN's ability to solve an inverse problem, the pre-trained INN was asked to output the possible printing parameters needed to print a 300 μm line. To limit the scope of potential printing parameters, $\chi$ values were selected that ensured the printing parameters had a nozzle size of 1.19 mm and velocity above 10 mm/s. The printing parameters determined by the deep INN were D=1.19 mm, H=1.23 mm, V=75 mm/s, and A=0.34 mm/s. An image of a printed line using these parameters are shown in FIG. 5D showing that the line measured is 120 pixels or 300 μm. After determining the optimized printing parameters, a vase with a 30-degree angle was printed. FIG. 5E shows an image of the printed vase which achieved good resolution on the first trial print.

In-Situ Process Optimization Using INN

Figure 6A:
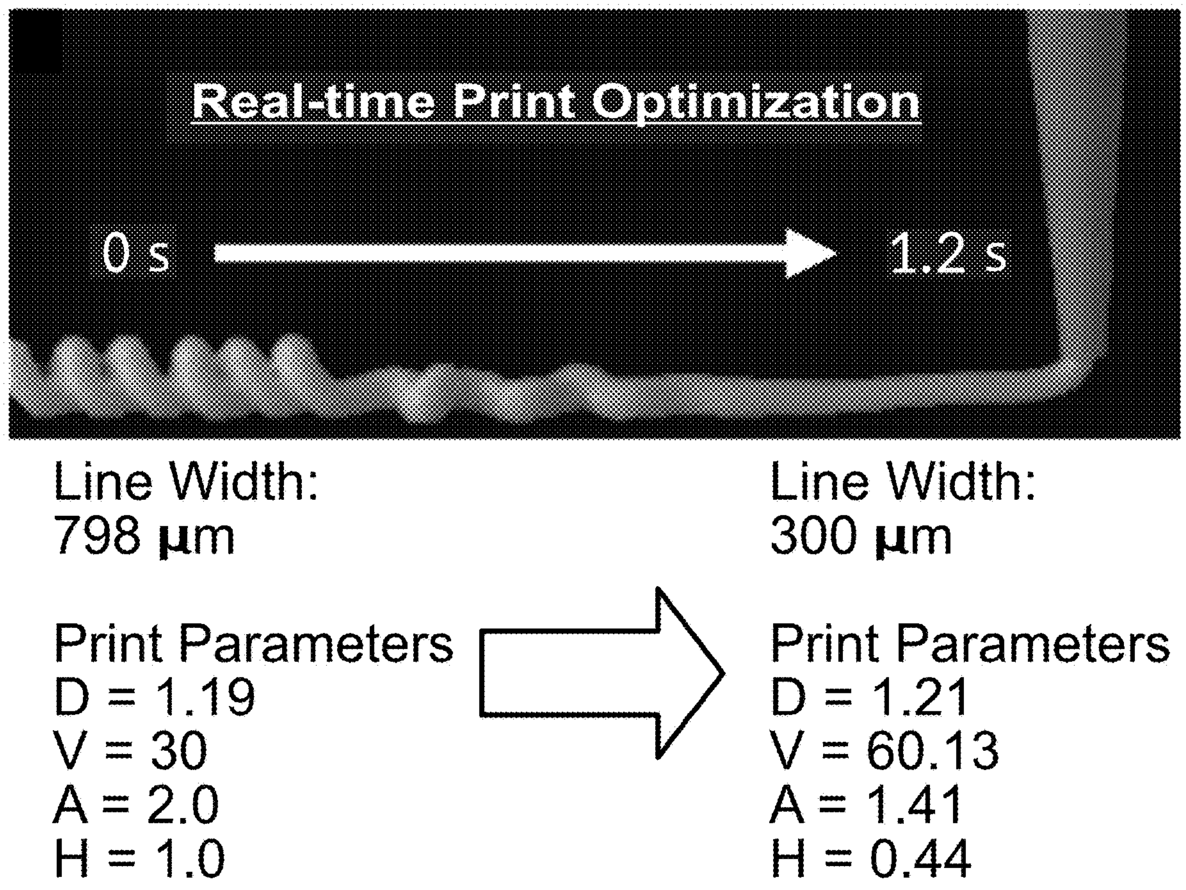
FIG. 6A shows an image of a printed silicone line that is being measured and optimized to reach a target line width within 1.2 s.

Using the deep INN model outlined above, the printing parameters needed to achieve a target line width can be rapidly determined. While there are many potential printing parameters to achieve a desired line width, real-time optimization requires finding the parameters associated with a desired line width that are closest in value to the current printing parameters as observed using computer vision. This is considered optimal because there is less machine overhead in transitioning the printing parameters to values that are closer to the current values. Here, a loss function is defined such that a global minimum is found where the print parameters will be optimized most rapidly. During the real-time optimization, this process is performed with respect to all four printing parameter variables. The loss function is constructed using system knowledge of the current printing parameters as well as the instantaneous line width as measured by the computer vision algorithms outlined above. A photograph showing real-time DIW print optimization from a random initial state to print a 300 μm line is shown in FIG. 6A. Here, the print parameters were optimized in 1.2 seconds. This is because the deep INN can perform a single-step parameter optimization by solving a single inverse problem to achieve the targeted line geometry, as described above. Regardless of the initial printed line geometry, the print can be optimized in under 2 seconds. The DIW printing parameters can be adjusted in real-time to achieve a targeted line width regardless of the initial printing conditions.

Figure 6B:
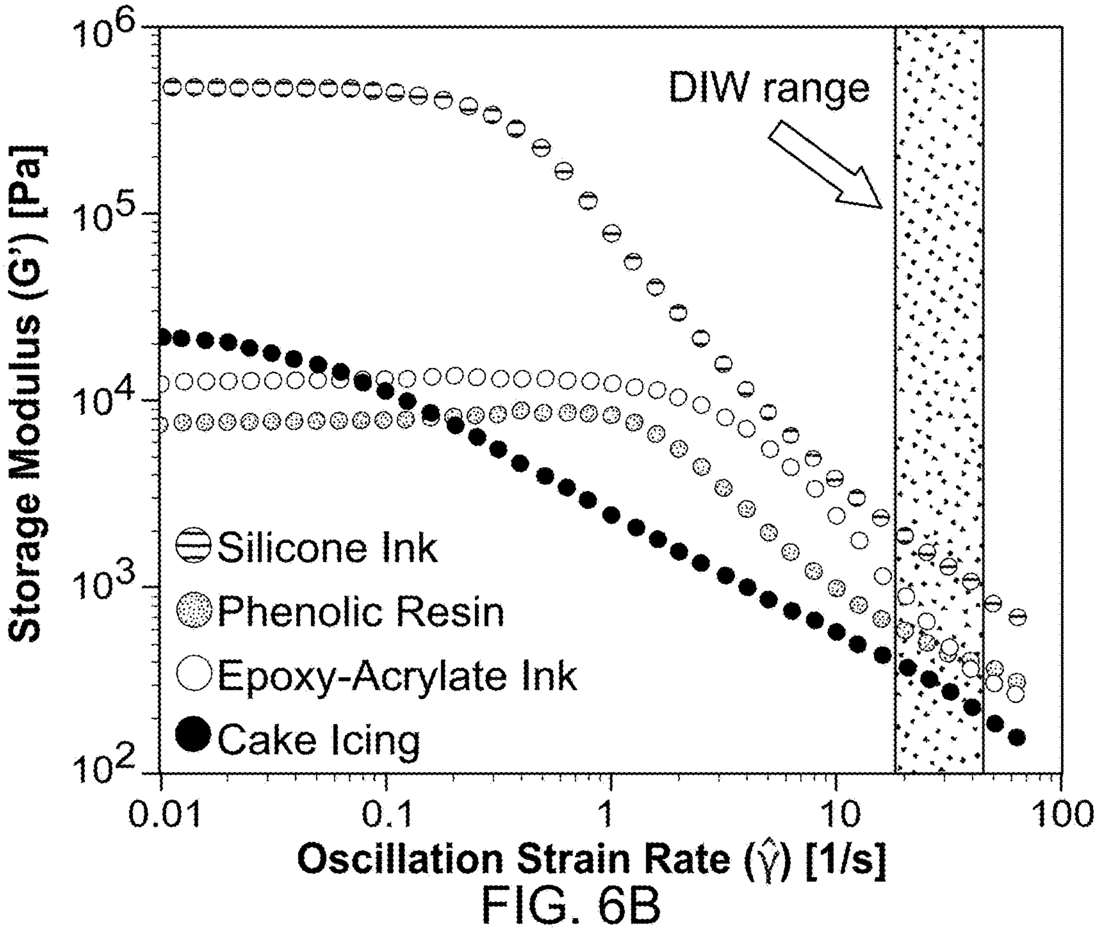
FIG. 6B shows optimization of a silicone ink printed from multiple initial printing parameter states.
Figure 6C:
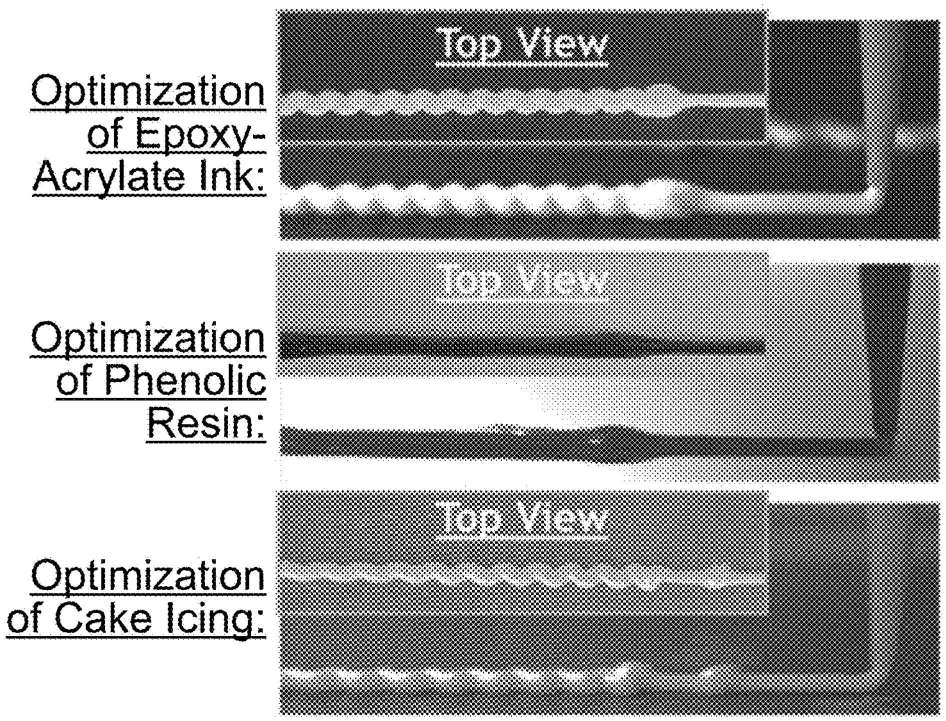
FIG. 6C shows images of real-time process optimization for multiple materials demonstrating this approach can be used for a variety of DIW inks.

Lastly, this approach is generalizable and can be used to perform real-time print optimization on other material systems. Importantly, inks were selected which have two critical material properties. Firstly, the materials selected are shear-thinning and rheologically stable at shear rates that correspond to DIW printing. Secondly, the materials selected have viscosities that are similar to the silicone ink at DIW shear rates. Rheological studies of the inks are shown in FIG. 6B. While each of the inks have distinct properties, they each exhibit shear thinning behavior and similar viscosities to the silicone ink at DIW shear rate ranges. FIG. 6C shows how the computer vision and deep INN can be used to provide in-situ optimization of select DIW inks. Here an epoxy-acrylate ink, a phenolic resin, and cake frosting are all printed and optimized to achieve a target line width in real-time. To enable visibility of each material for computer vision, the substrate or material color can be adjusted. As seen in the top view images of FIG. 6C, the epoxy-acrylate was modified using glass beads to be visibly opaque on a black substrate, the black phenolic resin was printed on a white substrate, and the pink cake frosting was printed on a black background. The same real-time print optimization approach for the silicone ink was used for each of the materials in FIG. 6C. As seen, each material achieved the target line width of 300 μm after 1.5 s.

The present invention has been described as machine learning for real-time monitoring and control of additive manufacturing. It will be understood that the above description is merely illustrative of the applications of the principles of the present invention, the scope of which is to be determined by the claims viewed in light of the specification. Other variants and modifications of the invention will be apparent to those of skill in the art.

The invention claimed is:

1. A method for in-situ process monitoring and optimization of direct ink write (DIW) printing, comprising:

providing a DIW printer configured to print an ink subject to one or more printing parameters, measuring an output of the printed ink in real-time using computer vision, comparing the measured output to a target output, when the output differs from the target output, adjusting the one or more printing parameters of the DIW printer in real time using a pre-trained invertible neural network model to produce the target output, wherein the invertible neural network models both a forward and an inverse relationship between the one or more printing parameters and the target output, and printing the ink on a substrate subject to the optimized one or more printing parameters in a single printing step.

2. The method of claim 1, wherein the one or more printing parameters comprises a nozzle diameter, print speed, linear extrusion rate, or height from the substrate.

3. The method of claim 1, wherein the output comprises a line width, line type, or line shape.

4. The method of claim 1, wherein the invertible neural network model and optimizing step finds the one or more printing parameters associated with the target line width that are closest in value to current printing parameters.

* * * * *